(12) United States Patent
Hanson (10) Patent No.: US 12,435,866 B1
(45) Date of Patent: Oct. 7, 2025

(54) WATERFRONT LIGHT

(71) Applicant: Touchstone Accent Lighting, Long Lake, MN (US)

(72) Inventor: Mark L. Hanson, Mound, MN (US)

(73) Assignee: Touchstone Accent Lighting, Long Lake, MN (US)

( * ) Notice: Subject to any disclaimer, the term of this patent is extended or adjusted under 35 U.S.C. 154(b) by 0 days.

(21) Appl. No.: 19/013,054

(22) Filed: Jan. 8, 2025

(51) Int. Cl.
| | | |
|---|---|---|
| *F21V 21/116* | (2006.01) | |
| *F21S 8/08* | (2006.01) | |
| *F21S 9/03* | (2006.01) | |
| *F21V 21/088* | (2006.01) | |
| *F21V 21/10* | (2006.01) | |
| *F21W 131/10* | (2006.01) | |
| *F21W 131/109* | (2006.01) | |

(52) U.S. Cl.
CPC ............. *F21V 21/116* (2013.01); *F21S 8/081* (2013.01); *F21S 9/03* (2013.01); *F21V 21/088* (2013.01); *F21V 21/10* (2013.01); *F21W 2131/10* (2013.01); *F21W 2131/109* (2013.01)

(58) Field of Classification Search
CPC ...... F21V 21/116; F21V 21/088; F21V 21/10; F21S 8/081; F21S 9/03; F21W 2131/10; F21W 2131/109
USPC .................................................. 362/410, 413
See application file for complete search history.

(56) References Cited

U.S. PATENT DOCUMENTS

| | | | | |
|---|---|---|---|---|
| 4,459,649 | A | * 7/1984 | Shaneour | F21S 8/086 |
| | | | | 362/396 |
| 4,823,241 | A | * 4/1989 | Trattner | F21S 9/03 |
| | | | | 362/183 |
| 5,055,984 | A | * 10/1991 | Hung | F21S 9/037 |
| | | | | 362/183 |
| 5,211,470 | A | * 5/1993 | Frost | F21V 21/10 |
| | | | | 362/183 |
| 10,641,464 | B2 | 5/2020 | Hanson | |
| D1,047,261 | S | 10/2024 | Hanson | |
| 12,146,333 | B1 | * 11/2024 | Ko | E04H 12/32 |

OTHER PUBLICATIONS

U.S. Appl. No. 29/840,294, filed May 27, 2022; Title, Paver Light, Mark L. Hanson.

* cited by examiner

*Primary Examiner* — Laura K Tso
(74) *Attorney, Agent, or Firm* — Edwin E. Voigt, II (57) ABSTRACT

The inventive illumination device includes a light assembly frame having a first longitudinal extending wall, a second longitudinal extending wall, a first upper beam, a first lower beam, a first wall end, a second upper beam, a second wall end, and a second lower beam providing an open top and an open bottom. A first end cap having a first rectangular shaped insert is disposed in the first wall end. A second end cap having a second rectangular shaped insert is disposed in the second wall end. A removable light assembly is positioned in the open top. The light assembly frame may be releasably engaged to a variety of supplemental support components proximate to a body of water.

16 Claims, 5 Drawing Sheets

WATERFRONT LIGHT

BACKGROUND OF THE INVENTION

In the past, it has been difficult to provide illumination to waterfronts which include a shoreline, a dock and/or boat lift lighting. The known waterfront lighting devices frequently required wiring between an illumination element and an electrical source, or the inclusion of batteries within the illumination source in order to provide electricity to a lighting unit and illumination along a waterfront structure.

Water and/or moisture in any form frequently adversely affects the known illumination devices, causing electrical shorting, tripping a circuit breaker panel, or degrading battery contacts for waterfront illumination sources. The exposure of water and/or moisture in any form to waterfront illumination sources necessitates frequent maintenance and repairs.

In the past, waterfront illumination sources were not reliable and sufficiently interchangeable for use with a wide variety of waterfront structures. Also, in the past the waterfront illumination devices were not reconfigurable to accommodate upgrades to a existing waterfront structure. Further, the past waterfront illumination devices were not flexible with respect to custom positioning relative to a waterfront structure for the provision of illumination to a particular desired location.

The known waterfront illumination devices also did not provide to an individual the flexibility to separate a light assembly from a light assembly frame in order to conveniently store the light assemblies in a suitable location during periods of non-use.

In the past waterfront illumination devices also did not provide the interchangeability between a standardized light assembly for engagement to any number of configurations of light assembly frames.

In the past, the known waterfront illumination devices did not provide to a user a fast, convenient, and simple procedure for the releasable engagement of a light assembly to a light assembly frame. Past waterfront illumination devices failed to provide convenient replacement of an illumination unit.

The art referred to and/or described above is not intended to constitute an admission that any patent, publication or other information referred to herein is "prior art" with respect to this invention. In addition, this section should not be construed to mean that a search has been made or that no other pertinent information as defined in 37 C.F.R. § 1.56(a) exists.

All U.S. patents and applications and all other published documents mentioned anywhere in this application are incorporated herein by reference in their entireties.

Without limiting the scope of the invention, a brief description of some of the claimed embodiments of the invention is set forth below. Additional details of the summarized embodiments of the invention and/or additional embodiments of the invention may be found in the Detailed Description of the Invention below.

A brief abstract of the technical disclosure in the specification is provided for the purposes of complying with 37 C.F.R. § 1.72.

SUMMARY OF THE INVENTION

The invention is directed to an illumination device frequently used in association with waterfront lighting applications including a light assembly frame having a first longitudinal extending wall, a second longitudinal extending wall, a first upper beam extending between the first longitudinal extending wall and the second longitudinal extending wall at a first wall end, a first lower beam extending between the first longitudinal extending wall and the second longitudinal extending wall at the first wall end, a second upper beam extending between the first longitudinal extending wall and the second longitudinal extending wall at a second wall end, and a second lower beam extending between the first longitudinal extending wall and the second longitudinal extending wall at the second wall end, where the light assembly frame has an open top and an open bottom.

In at least one embodiment, a first end cap includes a rectangular shaped insert having an insert top surface, an insert bottom surface, at least two insert side surfaces, where each of the at least two insert side surfaces extend between the insert top surface and the insert bottom surface.

The insert includes an interior insert face between the insert top surface, the insert bottom surface, and the at least insert side surfaces. The insert face is constructed and arranged for positioning within an interior of the light assembly frame in the first wall end. An insert aperture extends through the insert bottom surface and the first lower beam.

A top body surface is proximate and exterior of the insert top surface, a bottom body surface is proximate and exterior of the insert bottom surface, a body first side surface is proximate and exterior relative to the top body surface and the bottom body surface, and a body second side surface is proximate and exterior relative to the top body surface and the bottom body surface opposite to the body first side surface. An exterior body face is proximate and exterior to and extends between the top body surface, the bottom body surface, the body first side surface and the body second side surface. The exterior body face is opposite to the insert face. A second side surface aperture traverses the body second side surface.

A second end cap has a second rectangular shaped insert, a second insert top surface, a second insert bottom surface, and at least two second insert side surfaces which extend between the second insert top surface and the second insert bottom surface on opposite sides of the second rectangular shaped insert. A second insert face extends between the second insert top surface, the second insert bottom surface, and the at least two second insert side surfaces. The second insert face is constructed and arranged for positioning within an interior of the light assembly frame in the second wall end.

A second insert aperture extends through the second lower beam and the second insert bottom surface. A second top body surface is proximate and exterior of the second insert top surface, a second bottom body surface is proximate and exterior of the second insert bottom surface. A body first side surface is proximate and exterior of the second top body surface and the second bottom body surface. A second body second side surface is proximate and exterior of the second top body surface and the second bottom body surface opposite to the second body first side surface. A second exterior body surface is proximate and exterior to the second top body surface, the second bottom body surface, the second body first side surface, and the second body second side surface. The second exterior body surface is opposite to the second insert face. A second side surface aperture traverses the second body second side surface.

A light assembly is removably disposed in the open top, the light assembly includes a top having a ledge and a solar cell charger, a bottom, a first end, a second end, a first side and a second side. The bottom has at least one selection switch and an on/off switch. A controller 36 is in the interior of the light assembly and is in electrical communication with the selection switch and a plurality of light elements. The controller regulates illumination generated from the light elements through the open bottom of the light assembly frame. The light assembly frame is constructed and arranged for engagement to a structural component which in turn is engaged to a waterfront structure.

In some embodiments, the a structural component is an L-shaped bracket, the L-shaped bracket being releasably engaged to the first end cap and the second end cap.

In some alternative embodiments, the L-shaped bracket has an L-shaped bracket vertical wall which is disposed adjacent to one of the first longitudinal extending wall and the second longitudinal extending wall.

In at least one alternative embodiment, the structural component is a lateral collar engaged to one of the first longitudinal extending wall and the second longitudinal extending wall approximately equal distances between the first end cap and the second end cap.

In at least one embodiment, the lateral collar has a longitudinal collar bar, the longitudinal collar bar being releasably engaged to the first end cap and the second end cap.

In some embodiments, the lateral collar has a first diameter dimension, and the lateral collar is constructed and arranged for positioning over a support pole, the support pole having a second diameter dimension which is smaller than the first diameter dimension.

In some alternative embodiments, the structural component is an end collar which is engaged to one of the first end cap and the second end cap extending outwardly therefrom.

In at least one alternative embodiment, each of the first end cap and the second end cap have an insert face aperture, the insert face aperture having an end collar attachment hole, and an end collar fastener releasably engaged to the end collar attachment hole and the insert face aperture.

In at least one embodiment, the structural component includes an upper cup bracket, a support pole, and a lower cup bracket. The upper cup bracket is releasably engaged to the first end cap and the second end cap, and the support pole is releasably engaged to and descends from the upper cup bracket at a support pole upper end. The support pole in turn is releasably engaged to and ascends from the lower cup bracket at a support pole lower end. The lower cup bracket is releasably engaged to the support pole proximate to the support pole lower end.

In some embodiments, the upper cup bracket has an upper pole receiver and an upper cup bracket bar, the upper cup bracket bar is releasably engaged to the first end cap and the second end cap.

In some alternative embodiments, the lower cup bracket has a lower cup bracket bar and a lower press plate which is engaged to the lower cup bracket bar.

In at least one embodiment, the lower cup bracket bar has lower cup bracket bar opposite ends, each of the lower cup bracket bar opposite ends having a lower cup bracket bar aperture, the lower press plate having lower press plate opposite ends, each of the lower press plate opposite ends having a lower press plate aperture and an adjustable fastener engaged to each of the lower cup bracket bar apertures and the lower press plate apertures.

In some embodiments, the structural component includes a pole clamp assembly, the pole clamp assembly having a lower pole clamp bracket having a lower pole clamp receiver, a lower pole clamp bar engaged the lower pole clamp receiver, a support pole, and a pole grasping assembly, the pole grasping assembly having a pole grasping collar which in turn has a pole grasping bracket.

In some alternative embodiments, the second end cap engages the support pole at a support pole lower end, the lower pole clamp bar is also engaged to the first end cap and the second end cap, the lower pole clamp receiver having at least one lower pole clamp receiver aperture.

In at least one embodiment, the pole grasping collar has at least one pole grasping collar aperture and pole grasping bracket, the pole grasping bracket having an adjustable band clamp, the adjustable band clamp being constructed and arranged for releasable engagement to a waterfront structure.

In some embodiments, the pole grasping bracket has a clamp plate and two flange walls, each of the flange walls has an aligned flange wall slot, the flange wall slot being constructed and arranged for engagement to the adjustable band clamp.

These and other embodiments which characterize the invention are pointed out with particularity in the claims annexed hereto and forming a part hereof. However, for further understanding of the invention, its advantages and objectives obtained by its use, reference should be made to the drawings which form a further part hereof and the accompanying descriptive matter, in which there is illustrated and described embodiments of the invention.

Various other objects, features and attendant advantages of the present invention will become fully appreciated as the same becomes better understood when considered in conjunction with the accompanying drawings, in which like reference characters designate the same or similar parts throughout the several views, and wherein:

DETAILED DESCRIPTION OF THE INVENTION

In at least one embodiment, the reconfigurable waterfront lighting device is identified by reference numeral 10. The reconfigurable waterfront lighting device 10 includes a light assembly 26 which is substantially rectangular cuboid in shape and includes a top 12, a ledge 16, a bottom 14, a first end 18, a second end 20, a first side 22, and a second side 24.

In a preferred embodiment the light assembly 26 includes and encloses as necessary the electrical components required to generate light. The light assembly 26 is preferably water resistant and is formed of water resistant materials to function in wet, humid and/or adverse weather conditions.

Figure 3:
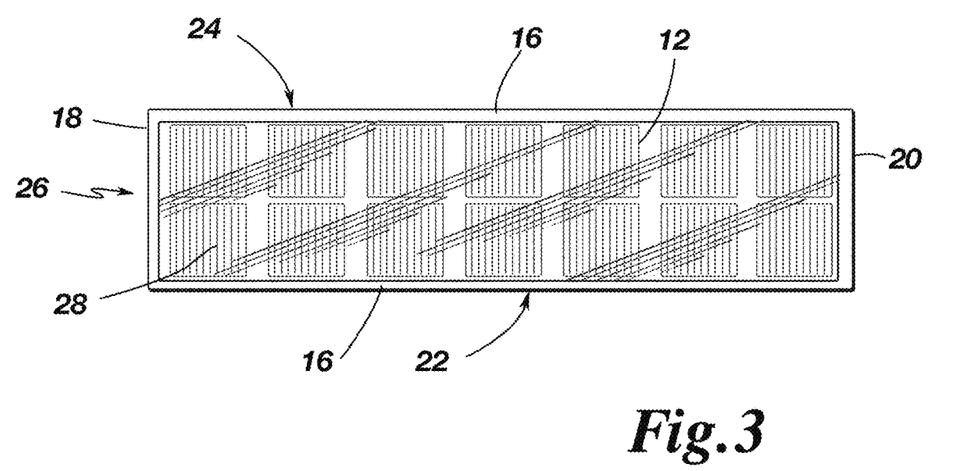
FIG. 3 is a detail top plan view of one alternative embodiment of the light assembly of the Waterfront Lighting Device.
Figure 4:
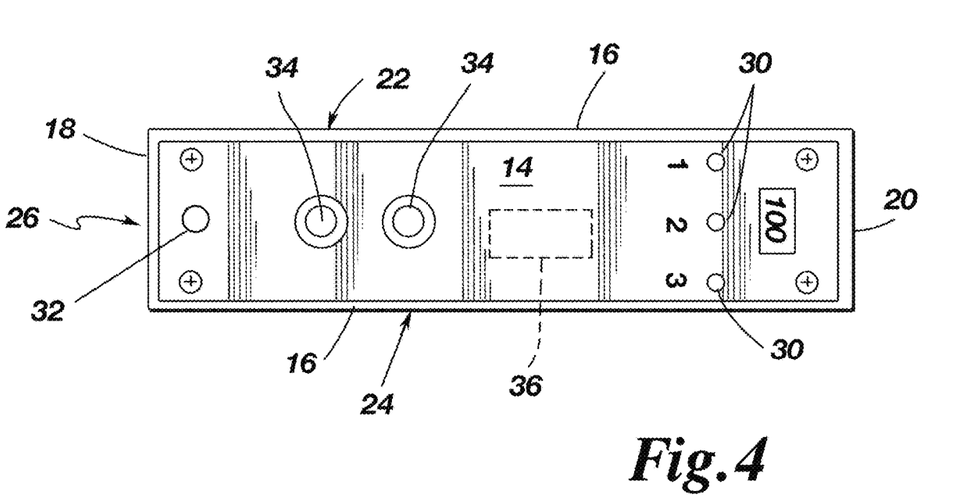
FIG. 4 is a detail bottom plan view of one alternative embodiment of the light assembly of the Waterfront Lighting Device.

In one preferred embodiment, the light assembly 26 includes a solar cell charger 28 which transforms sunlight 194 into electricity to charge a battery (not shown) located within the interior of the light assembly 26. Also included within the interior of the light assembly 26 is a printed circuit board or a controller 36, and a plurality of connecting wire harnesses to communicate electricity between the solar cell charger 28, the printed circuit board or controller 36, the selection switches 30, an on off switch 32, and light elements 34. (FIG. 3 and FIG. 4)

In at least one embodiment, the light elements 34 may be a plurality of light emitting diodes of the same or different colors, including but not necessarily limited to red, green, blue and/or white. The illumination of one or more of the light emitting diodes in any combination may provide a desired color of light.

In at least one preferred embodiment, the on/off switch 32 may be used to activate or to deactivate the waterfront lighting device 10 which is reconfigurable for adaptation to a variety of waterfront structures.

Additionally, in a preferred embodiment, the printed circuit board or controller 36 (shown in phantom line) may include a programmable timer to activate the light elements 34 at specific times of the day and deactivate the light elements 34 at alternative times of the day. The printed circuit board or controller 36 may also be in electrical communication with a light sensor (not shown) which may detect the absence of light to trigger the controller 36 to activate the light elements 34.

In an alternative embodiment, the controller 36 may regulate the electricity entering the light elements 34 to modify the wavelength or color of light emitted from the light element's 34, including but not necessarily limited to alternative color selections or mixtures of red, green, blue, yellow, purple, white, orange and amber, to name a few of the available colors to be generated by the reconfigurable waterfront lighting device 10.

In alternative embodiments, the controller 36 may regulate the illumination of a pattern of aesthetically pleasing light signals from the light elements 34. In one example, the color of light emitted from the light elements 34 may gradually transition between a selected group of colors according to a repeating timing sequence. For example, the controller 36 may actuate the light element's 34 to generate amber colored light for ten seconds, then over the next four seconds, the color of the light may transition to red, whereupon the red light may be generated for ten seconds, then over the next four seconds the color of the light may transition to green, then the green light may be generated for ten seconds, then over the next four seconds the color of the light may transition to blue, then the blue light may be generated for ten seconds, then over the next four seconds, the color of light may transition to amber, then the amber light may be generated for ten seconds. The controller 36 may be programmed to repeat a desired cycle for groups of colored illumination signals for a selected period of time.

In other embodiments, an almost infinite number and/or variety of colors, patterns, and/or sequences of light signals may be regulated by the controller 36 for emission from the light elements 34.

In alternative embodiments, the light element's 34 are not required to be light emitting diodes and may be other types of illumination elements.

The light element's 34 may be turned on and off through the use of the on/off switch 32, or according to a programmed timing function as regulated by the controller 36. Alternatively, the light assembly 26 may be actuated by a remote control communication device.

In a preferred embodiment, a ledge 16 extends outwardly from the top 12 along the first side 22 and second side 24 of the light assembly 26. The ledge 16 functions as a positioning limiter with respect to the light assembly frame 38. The ledge 16 contacts the upper surface of the light assembly frame 38 proximate to the first side 22 and second side 24, disposing the light assembly 26 within the interior of the light assembly frame 38.

In the lease one alternative embodiment, the light assembly frame 38 includes a first longitudinal extending wall 40 and a second longitudinal extending wall 42. The first longitudinal extending wall 40 and second longitudinal extending wall 42 are preferably in vertical planes which are parallel to each other, on opposite sides of the light assembly frame 38.

In at least one embodiment, a first upper beam 44 traverses between the top of the first longitudinal extending wall 40 and the top of the second longitudinal extending wall 42, at a first wall end 46. In this embodiment, a first lower beam 48 traverses between the bottom of the first longitudinal extending wall 40 and the bottom of the second longitudinal extending wall 42 at the first wall end 46.

In addition, a second upper beam 50 traverses between the top of the first longitudinal extending wall 40 and the top of the second longitudinal extending wall 42, at a second wall end 52. A second lower beam 54 traverses between the bottom of the first longitudinal extending wall 40 and the bottom of the second longitudinal extending wall 42, at the second wall end 52.

In some embodiments, the light assembly frame 38 is substantially rectangular prism in shape having a solid first longitudinal extending wall 40 and a solid second longitudinal extending wall 42 defining sides of the light assembly frame 38. The light assembly frame 38 includes an open first wall end 50, an open second wall end 52, an open top 56, and an open bottom 58.

In at least one alternative embodiment, the ledge 16 engages the light assembly frame 38 along the top of each of the first longitudinal extending wall 40 and second longitudinal extending wall 42 supporting the light assembly 26 within the interior of the light assembly frame 38. The open bottom 58 permits access to the selection switches 30 and the on/off switch 32, as well as enabling the transmission of illumination/light as shown by arrows 190 from the light elements 34 through the open bottom 58.

In a preferred embodiment, the light assembly frame 38 includes a first end cap 60 inserted into the first wall end 46 and a second end cap 62 inserted into the second wall end 52. A portion of the first end cap 60 identified as a rectangular shaped insert 64, in an operative position is surrounded by the first upper beam 44, second longitudinal extending wall 42, first lower beam 48 and the first longitudinal extending wall 40. A portion of the second end cap 62 identified as a rectangular shaped insert 64, in an operative position is surrounded by the second upper beam 50, second longitudinal extending wall 42, second lower beam 54 and first longitudinal extending wall 40.

In some embodiments, the rectangular shaped inserts 64 of the first end cap 60 and the second end cap 62 each extend inwardly from an end cap body 66. The rectangular shaped insert 64 is preferably positioned to the interior of either the first wall end 46 or the second wall end 52.

The first end cap 60 and the second end cap 62 each include an insert top surface 68, an insert bottom surface 70, and an insert face 72. An insert aperture 74, which may be threaded, may traverse the insert top surface 68 and the insert bottom surface 70. The insert aperture 74 is preferably centrally positioned relative to the insert top surface 68 and insert bottom surface 70.

An insert face aperture 76 is preferably centrally positioned relative to the insert face 72 and extends from the insert face 72 towards the end cap body 66. The insert face aperture 76 may also be threaded.

In at least one embodiment, the end cap body 66 includes a top body surface 78, a bottom body surface 80, a body first side surface 82, a body second side surface 84, and a exterior body face 86. In some embodiments, the insert face aperture 76 extends from the insert face 72 to the exterior body face 86, providing a threaded passage through each of the first end cap 60 and second end cap 62.

In at least one alternative embodiment, the body second side surface 84 includes a body positioning channel 88 and a second side surface aperture 90. (FIG. 7) The body positioning channel 88 may extend the approximate width of the body second side surface 84 and have arcuate exterior ends. The central portion of the body positioning channel 88 proximate to the second side surface aperture 90, may be arcuate in shape towards the exterior body face 86 and the bottom body surface 80.

In at least one embodiment, an insertion limiter is established between the top body surface 78 and the insert top surface 68; the bottom body surface 80 and the insert bottom surface 70; the body first side surface 82 and an insert side surface 92; and the body second side surface 84 and the opposite insert side surface 92.

In the operative engaged position at the first wall end 46, the interior end of the bottom body surface 80 is in contact with the exterior of the first lower beam 48; the interior end of the body first side surface 82 is in contact with the exterior of the first longitudinal extending wall 40; the interior end of the top body surface 78 is in contact with the exterior of the first upper beam 44; and the interior end of the body second side surface 84 is in contact with the exterior of the second longitudinal extending wall 42.

In the operative engaged position at the second wall end 52, the interior end of the bottom body surface 80 is in contact with the exterior of the second lower beam 54; the interior end of the body first side surface 82 is in contact with the exterior of the first longitudinal extending wall 40; the interior end of the top body surface 78 is in contact with the exterior of the second lower beam 54; and the interior end of the body second side surface 84 is in contact with the exterior of the second longitudinal extending wall 42.

In at least one alternative embodiment, the body positioning channel 88 facilitates the engagement of a mechanical fastener into the second side surface aperture 90.

In a preferred embodiment, each of the first lower beam 48 and second lower beam 54 include a centrally positioned lower beam aperture 94. The lower beam aperture 94 may be threaded and aligned with the insert aperture 74 at the first wall end 46 and the second wall end 52. A mechanical fastener such as a threaded bolt, threaded screw or threaded rod, may releasably engage each of the lower beam aperture's 94 to the insert aperture's 74 to removably secure the first end cap 60 and the second end cap 62 to the light assembly frame 38.

It should be noted that the engagement between a fastener and the lower beam aperture's 94 and the insert aperture's 74 is located on the bottom of the light assembly frame 38, when the light assembly frame 38 is placed into an operative position to generate illumination downwardly through the open bottom 58.

In this embodiment, the light assembly 26 is positioned above the open top 56 and moved downwardly for engagement of the ledge 16 to the top surfaces of the first longitudinal extending wall 40 and second longitudinal extending wall 42. The light assembly 26 is also interior to the first upper beam 44 and second upper beam 50. In the preferred embodiments described herein the mechanical fasteners connecting the lower beam aperture's 94 to the insert aperture's 74 are located downwardly below the light assembly frame 38 when the light assembly frame 38 is in the operative position. It should also be noted that the light assembly 26 may be inserted into the light assembly frame 38 with the on/off switch 32 proximate to either of the first wall end 46 or the second wall end 52 as appropriate for convenience with respect to a particular application.

It should be noted that the body second side surface's 84 of each of the first end cap 60 and second end cap 62 are disposed proximate to, are aligned with, and establish a vertical plane, relative to the second longitudinal extending wall 42. The second longitudinal extending wall 42 and the body second side surface's 84 establish a smooth outer or exterior surface for the reconfigurable waterfront lighting device 10.

In at least one embodiment, a mechanical fastener such as a threaded screw, threaded bolt or threaded rod is inserted into the lower beam aperture 94 of the first lower beam 48 to engage the insert aperture 74 of the insert bottom surface 70 to releasably secure and attach the first end cap 60 within the interior of the first wall end 46.

An additional mechanical fastener such as a threaded screw, threaded bolt or threaded rod may be inserted into the underside of the lower beam aperture 94 of the second lower beam 54 to engage the insert aperture 74 of the insert bottom surface 70 to releasably secure and attach the second end cap 62 within the interior of the second wall end 52. The mechanical fasteners as described herein pass upwardly from the underside of the light assembly frame 38 into the first end cap 60 and the second end cap 62 to removably secure the first end cap 60 within the first wall end 46 and the second end cap 62 within the second wall end 52.

In the operative position where the first end cap 60 is disposed within the first wall end 46 and the second end cap 62 as disposed within the second wall end 52, the top body surface 78, bottom body surface 80, body first side surface 82, body second side surface 84, exterior body face 86, body positioning channel 88 and second side surface aperture 90 are positioned to the exterior of the light assembly frame 38.

In a preferred embodiment, in the operative position, the reconfigurable waterfront lighting device 10 includes the light assembly frame 38 having the releasably attached first end cap 60 and second end cap 62, and the light assembly 26 releasably and removably positioned within the light assembly frame 38 as described herein.

In at least one embodiment, a threaded rod or elongated set screw may pass from the exterior of one or both of the first end cap 60 and the second end cap 62 through the exterior body face 86, into the insert face aperture 76, exiting the insert face 72 proximate to one or both of the first end 18 and/or second end 20 of the light assembly 26. The threaded rod or elongated set screw may be used to exert pressure against the first end 18 and/or first side 22 in order to assist in the releasable engagement of the light assembly 26 within the light assembly frame 38 preventing inadvertent separation therefrom.

In at least one embodiment, the reconfigurable waterfront lighting device 10 may further include supplemental components to provide a modular reconfiguration for engagement to waterfront structures such as docks, dock support poles, dock frames, hand railings, boatlift poles, and/or boatlift frames, to name a few of the types of structures which may receive the reconfigurable waterfront lighting device 10.

In a preferred embodiment, a supplemental component may be releasably engaged to the first end cap 60 and the second end cap 62. As may be seen in FIGS. 1 and 2 the supplemental component may be a L-shaped bracket 98. The L-shaped bracket 98 may include an L-shaped bracket vertical wall 100 and an L-shaped bracket horizontal wall 102. Each of the opposite ends of the L-shaped bracket vertical wall 100 include a vertical wall bracket aperture 104. During use of the L-shaped bracket 98, the L-shaped bracket vertical wall 100 is positioned against the second longitudinal extending wall 42 and the body second side surface 84 of the first end cap 60 and second end cap 62. Preferably each of the vertical wall bracket aperture's 104 is aligned relative to the body positioning channel's 88 and second side surface aperture's 90 of the body second side surface's 84 of the first end cap 60 and second end cap 62.

Figures 1, 2:
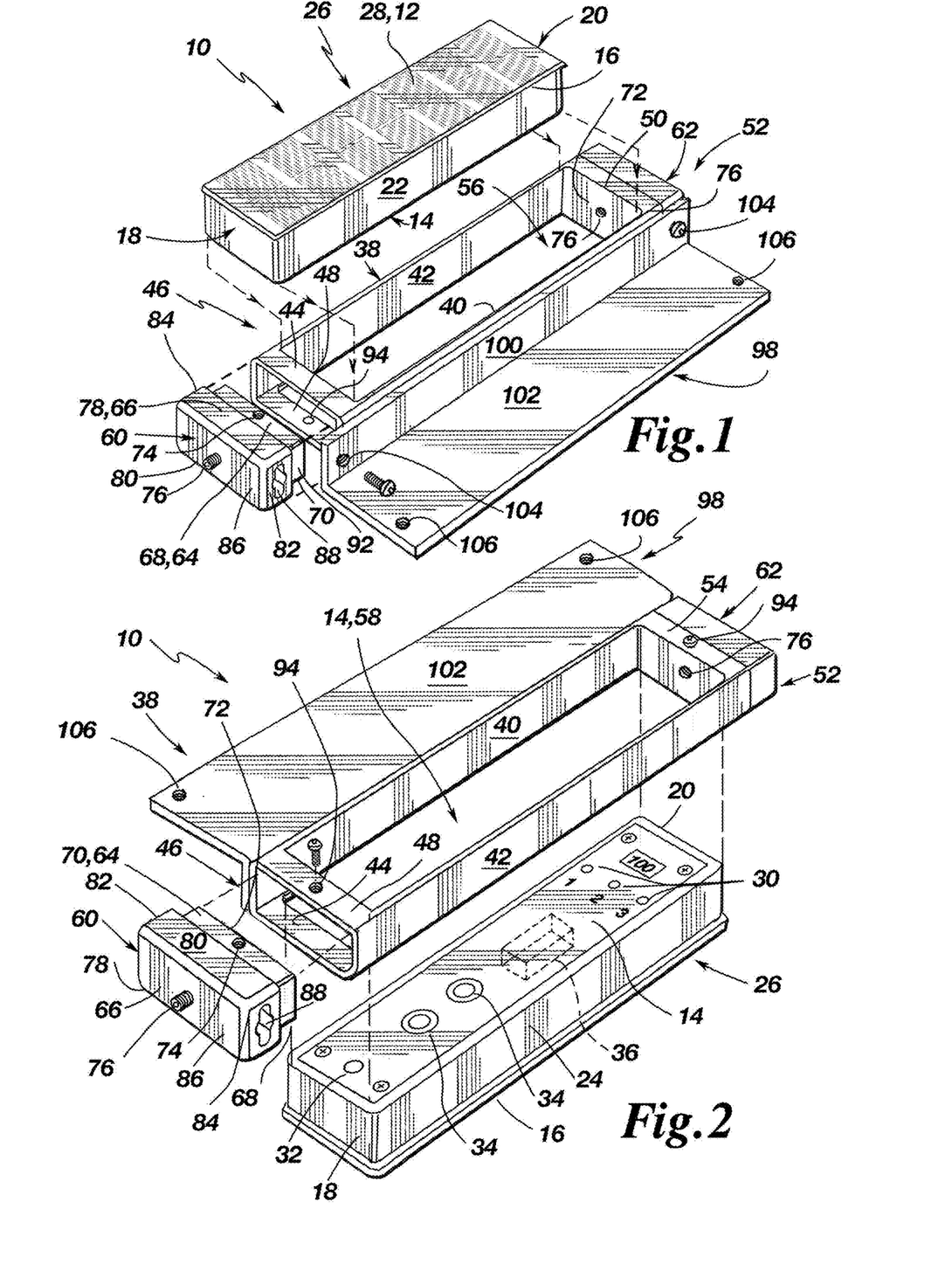
FIG. 1 is an exploded perspective top view of one alternative embodiment of the Waterfront Lighting Device engaged to an L-shaped bracket.
FIG. 2 is an exploded perspective bottom view of one alternative embodiment of the Waterfront Lighting Device engaged to an L-shaped bracket.

A mechanical fastener such as a threaded screw, threaded bolt, or threaded rod to name a few of the many suitable types of mechanical fasteners, may then be used to releasably secure the L-shaped bracket vertical wall 100 to the body second side surface's 84 and the second longitudinal extending wall 42 of the light assembly frame 38.

In this configuration the L-shaped bracket horizontal wall 102 extends away from the bottom or lower portion of the light assembly frame 38 extending substantially perpendicularly therefrom. The L-shaped bracket horizontal wall 102 may then be positioned for flush contact with the bottom surface of a handrail, where the L-shaped bracket vertical wall 100 is disposed adjacent to, and is in contact with, a side surface of a handrail.

Mechanical fasteners such as screws may then be used to releasably attach the light assembly frame 38, first end cap 60 and second end cap 62 to a handrail by inserting the mechanical fasteners from the underside of the horizontal wall bracket aperture 106 upwardly through the L-shaped bracket horizontal wall 102 into the underside of the handrail.

Upon the releasable attachment of the light assembly frame 38, first end cap 60, second end cap 62 and L-shaped bracket 98 to a handrail, a light assembly 26 may be positioned within the open top 56, where the ledge 16 will engage the upper surface of the first longitudinal extending wall 40 and second longitudinal extending wall 42. Exposure of sunlight 194 upon the solar cells of the solar cell charger 28 on the top 12 of the light assembly 26 will electrically charge a battery to provide electricity to the light elements 34 during use of the reconfigurable waterfront lighting device 10.

It should be noted that the reconfigurable waterfront lighting device 10 having the L-shaped bracket 98 may be releasably attached to an inside or outside surface of a handrail as used for access to a dock at the discretion of an individual. It should also be noted that the separation distance between adjacent reconfigurable waterfront lighting devices 10 having a L-shaped bracket 98 engaged to a handrail will be sufficient to provide a desired illumination level required for a particular application. It should be further noted that any number of reconfigurable waterfront lighting devices 10 having L-shaped bracket's 98 may be used to illuminate a desired area as described herein.

It should be noted that the engagement between the L-shaped bracket 98 and the light assembly frame 38 will position the L-shaped bracket horizontal wall 102 proximate to, and extending outwardly from, the top of the first longitudinal extending wall 40 and the second longitudinal extending wall 42 when the reconfigurable waterfront lighting device 10 is in an operative position. In this embodiment, the lower beam aperture's 94 will be disposed on the lower surface of the light assembly frame 38 opposite to the open top 56 which is proximate to the L-shaped bracket horizontal wall 102. The light assembly 26 may then be engaged to the light assembly frame 38 as previously described.

Figures 5, 6:
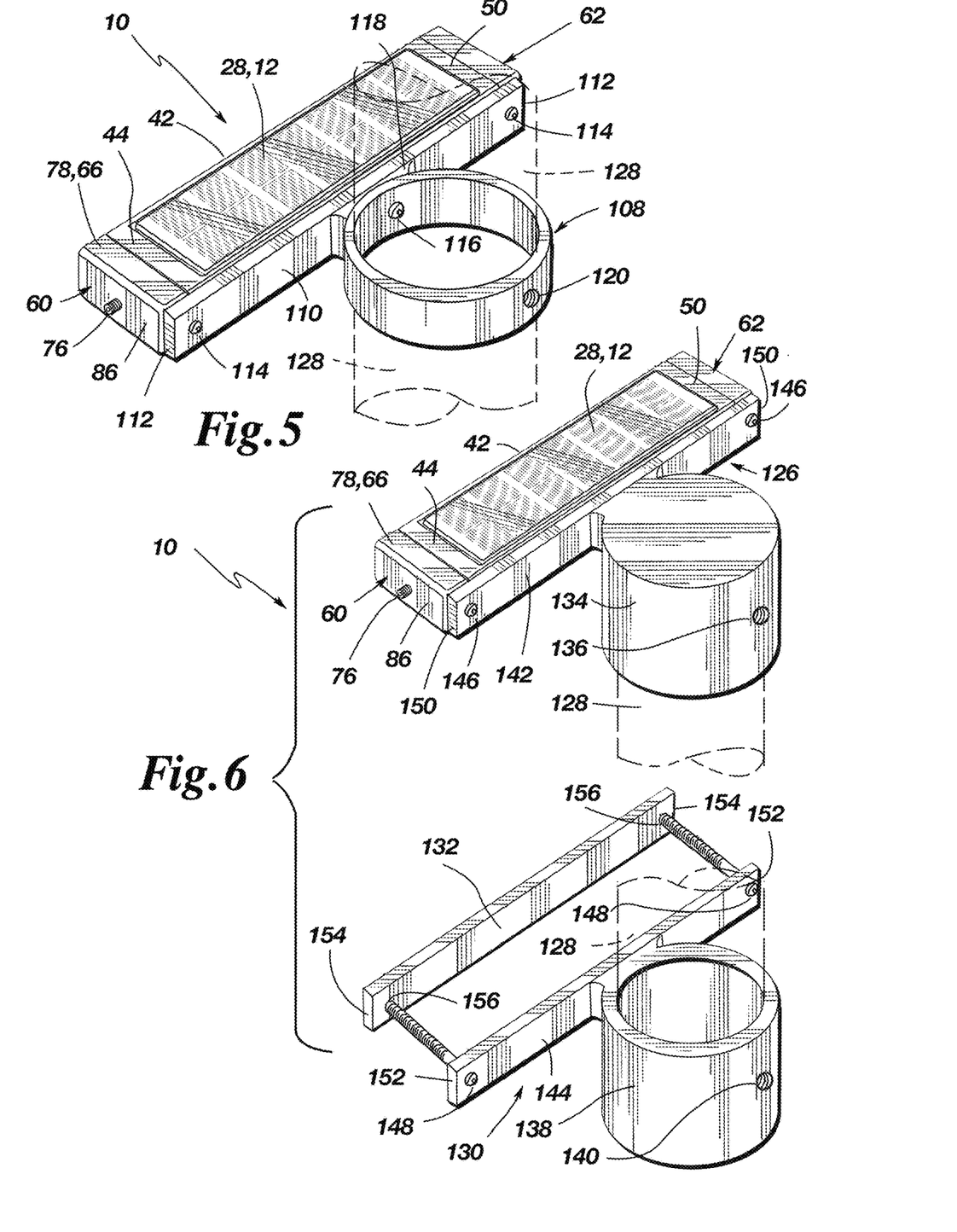
FIG. 5 is a perspective view of one alternative embodiment of the Waterfront Lighting Device engaged to a lateral collar.
FIG. 6 is an exploded perspective view of one alternative embodiment of the Waterfront Lighting Device engaged to an upper cup bracket, a support pole shown in phantom line and a lower cup bracket.

In an alternative embodiment, as shown in FIG. 5, the reconfigurable waterfront lighting device 10 may further include a supplemental component such as a lateral collar 108 to provide a modular alternative configuration for the reconfigurable waterfront lighting device 10 for releasable attachment to a waterfront structure such as a cylindrical dock support pole.

In this alternative embodiment, the first end cap 60 and the second end cap 62 releasably engaged to the first wall end 46 and the second wall end 52 as earlier described. The supplemental component is formed of a longitudinal collar bar 110 having a centrally disposed lateral collar 108. The longitudinal collar bar 110 is preferably sized to have the same height dimension as the second longitudinal extending wall 42 and a length dimension equal to the length dimension of the second longitudinal extending wall 42 having both of the first end cap 60 and the second end cap 62 engaged thereto.

In this embodiment, the longitudinal collar bar 110 has opposite ends 112. Each of the opposite ends 112 include a collar bar aperture 114. Each of the collar bar aperture 114 are aligned with and preferably positioned proximate to a respective body positioning channel 88 and second side surface aperture 90 of the first end cap 60 and second end cap 62.

In this alternative configuration, the longitudinal collar bar 110 may include a centrally located collar attachment aperture 116. The collar attachment aperture 116 is approximately equal distances between each of the opposite ends 112 and the longitudinal collar bar 110.

In some alternative embodiments, the longitudinal collar bar 110 may include an exterior central recess portion 118 which is shaped to receive a portion of the exterior surface of a lateral collar 108 to improve the engagement of the lateral collar 108 to the longitudinal collar bar 110. The central recessed portion 118 may complement the curvature of the circumference of the lateral collar 108.

In this embodiment, the lateral collar 108 is preferably substantially cylindrical in shape and may include any desired diameter dimension for use with a cylindrical shaped dock support or pole 128. The lateral collar 108 may be formed of metallic materials which do not rust when exposed to moisture, or other sturdy materials, including but not limited to the use of aluminum, galvanized metal, stainless steel, carbon or carbon fibers, or plastic materials provided that the functions and features identified herein are not sacrificed and do not fail during normal use of the reconfigurable waterfront lighting device 10.

A mechanical fastener such as a screw, bolt or threaded rod may be used to pass from the center of the lateral collar 108 and into the collar attachment aperture 116 to releasably attach the lateral collar 108 to the longitudinal collar bar 110. The longitudinal collar bar 110 being previously engaged to the first end cap 60 and the second end cap 62 as releasably attached to the light assembly frame 38.

In at least one embodiment, the lateral collar 108 includes at least one, and preferably two or more, collar attachment holes 120. In a preferred embodiment, the lateral collar 108 as previously engaged to the light assembly frame 38, first end cap 60 and second end cap 62, will have a sufficient diameter dimension to be disposed over and in surrounding engagement relative to a cylindrically shaped dock support pole 128. The lateral collar 108 disposed over the support pole 128 may be lowered and/or rotated relative to the support pole 128 to position the light assembly frame 38 at a desired location or angle to maximize the provision of illumination for a particular application.

The lateral collar 108 as disposed in surrounding engagement relative to a support pole 128 permits a user to reposition and/or to relocate the reconfigurable waterfront lighting device 10 as desired.

It should be noted that the engagement between the lower beam aperture's 94 and the insert aperture's 74 will be on the bottom surface of the light assembly frame 38 when the lateral collar 108 is disposed over and engaged to a support pole 128. In an operative position, the open top 56 will be disposed upwardly relative to the dock support pole support pole 128. The light assembly 26 may then be placed within the open top 56 and light assembly frame 38 as previously described with the light element's 34 directed downwardly towards a dock surface 192.

In an alternative embodiment, one or more of the collar attachment holes 120 as passing through the perimeter of the lateral collar 108, may receive from the exterior of the lateral collar 108, a second mechanical attachment such as a screw, bolt, or threaded rod. The second mechanical fastener or attachment will pass through the collar attachment holes 120 in an inward direction and contact the exterior surface of a support pole 128 in order to releasably secure the lateral collar 108 to the exterior of a cylindrical support pole 128 through a pressure fit. The inclusion of a plurality of collar attachment holes 120 around the perimeter of the lateral collar 108 enables the reconfigurable waterfront lighting device 10 and lateral collar 108 to be secured at a variety of heights and/or angular configurations relative to a dock and/or support pole 128.

The tightening of the second mechanical fastener as disposed through the collar attachment holes 120 against the exterior surface of the support pole 128, or as into dock support pole apertures, secures the reconfigurable waterfront lighting device 10 in a desired location to provide illumination to a walking surface of a dock.

Figures 7, 8, 9:
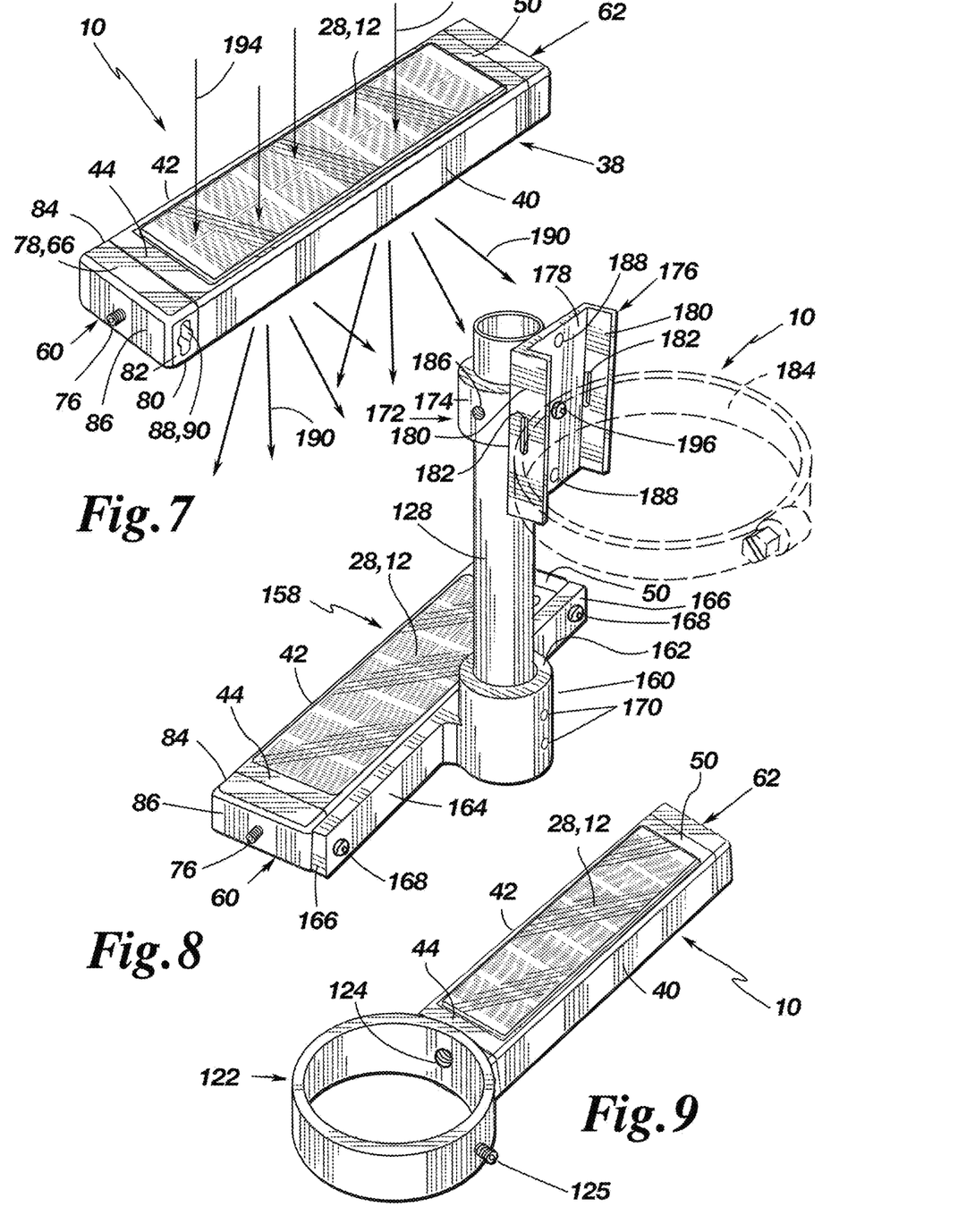
FIG. 7 is an exploded perspective top view of one alternative embodiment of the Waterfront Lighting Device.
FIG. 8 is a perspective view of one alternative embodiment of the Waterfront Lighting Device engaged to a pole clamp assembly.
FIG. 9 is a perspective view of one alternative embodiment of the Waterfront Lighting Device engaged to an end collar.

In an alternative embodiment as shown in FIG. 9, the reconfigurable waterfront lighting device 10 may further include a supplemental component such as a end collar 122 to provide a modular alternative configuration for the reconfigurable waterfront lighting device 10 for releasable attachment to a waterfront structure such as a cylindrical support pole 128.

In this alternative embodiment, the first end cap 60 and the second end cap 62 are releasably engaged to the first wall end 46 and second wall end 52 as earlier described. The end collar 122 is releasably engaged to the exterior body face 86 of either the first end cap 60 or the second end cap 62 as required in a particular application.

In this embodiment, the exterior body face 86 of one or both of the first end cap 60 and the second end cap 62 include the insert face aperture 76. A mechanical fastener such as a screw, bolt or threaded rod, may be used to pass through a end collar attachment hole 124 for entry into an insert face aperture 76 to releasably attach the end collar 122 to the exterior end of the light assembly frame 38.

In this embodiment a longitudinal collar bar 110 is not required, and the end collar 122 is connected directly to the insert face 72 of either the first end cap 60 or the second end cap 62.

In this embodiment, the end collar 122 preferably has a height dimension which is substantially equal to the height dimension of the insert face 72 of the first end cap 60 and the second end cap 62.

In at least one alternative embodiment, the insert face 72 of one of the first end cap 60 or the second end cap 62 may include an exterior central recessed portion 118 which is shaped to receive a portion of the exterior surface of the end collar 122 in order to improve the engagement of end collar 122 to the insert face 72. The central recessed portion 118 may match the curvature of the circumference of the end collar 122.

In this alternative embodiment, the end collar 122 is preferably substantially cylindrical in shape and may include any desired diameter dimension for use with a cylindrical shaped dock support or support pole 128. The end collar 122 may be formed of metallic materials which do not rust upon exposure to moisture. Alternatively, the end collar 122 may be formed of other sturdy materials including but not limited to the use of aluminum, galvanized metal, stainless steel, carbon or carbon fibers, or plastic materials provided that the functions and features identified herein are not sacrificed and do not fail during normal use of the reconfigurable waterfront lighting device 10.

In at least one embodiment, the end collar 122 includes at least one, and preferably two or more end collar pole attachment apertures 125. A second mechanical fastener such as a screw, bolt or threaded rod may be used to pass from the exterior into at least one of the end collar pole attachment apertures 125.

The second mechanical attachment such as a screw, bolt, or threaded rod may pass through the end collar pole attachment apertures 125 in an inward direction and contact the exterior surface of a support pole 128 in order to releasably secure the end collar 122 to the exterior of a cylindrical support pole 128 through a pressure fit. The inclusion of a plurality of end collar pole attachment apertures 125 around the perimeter of the end collar 122 enables the reconfigurable waterfront lighting device 10 and end collar 122 to be secured at a variety of heights and/or angular configurations relative to a dock and/or support pole 128. It should be noted that a second mechanical fastener may pass through an end collar pole attachment aperture 125 and into a dock, dock support and/or aperture within a dock support pole 128.

The tightening of the second mechanical fastener as disposed through the end collar pole attachment apertures 125 against the exterior surface of the support pole 128, or as into dock support pole apertures, secures the reconfigurable waterfront lighting device 10 in a desired location to provide illumination to a walking surface of a dock.

In at least one embodiment, the end collar 122 as previously engaged to the insert face aperture 76 will be of sufficient size to be disposed over and in surrounding engagement relative to a cylindrically shaped support pole 128. The end collar 122 is disposed over the support pole 128 may be lowered and/or rotated relative to the support pole 128 in order to position the light assembly frame 38 at a desired location or angle to maximize the provision of illumination during use of the reconfigurable waterfront light 10. The feature of the end collar 122 and surrounding engagement to a support pole 128 permits a user to reposition and/or to relocate the reconfigurable waterfront lighting device 10 is required for a particular application.

In some embodiments, the end collar 122 as engaged to the reconfigurable waterfront lighting device 10, is used in applications for positioning exterior relative to an edge of a dock or to provide illumination to a corner section of a dock.

In the embodiment utilizing the end collar 122, it should be noted that the engagement between the fastener through the lower beam aperture's 94 and the insert aperture's 74 will be on the bottom surface of the light assembly frame 38, when the end collar 122 is disposed over and engaged to a support pole 128. In the operative position, the lower beam aperture's 94 and the insert aperture's 74 will be disposed downwardly and the open top 56 will be upwardly relative to the dock and/or support pole 128. The light assembly 26 may then be placed within the open top 56 and the light assembly frame 38 as previously described with the light element's 34 directed downwardly towards a dock surface 192.

In at least one embodiment, an alternative supplemental component is depicted in FIG. 6. In this embodiment, the reconfigurable waterfront lighting device 10 may include an upper cup bracket 126, a support pole 128, a lower cup bracket 130, and a lower press plate 132. In this embodiment, the lower cup bracket 130 and the lower press plate 132 are used for attachment of the reconfigurable waterfront lighting device 10 to the frame of a dock.

In the embodiment of FIG. 6, the support pole 128 extends vertically from the lower cup bracket 130 for a desired distance where the upper cup bracket 126 is attached to the top of the support pole 128. The upper cup bracket 126 is attached to the light assembly frame 38 to position the reconfigurable waterfront lighting device 10 and light assembly 26 at a desired height above a dock or deck.

In the alternative embodiment as depicted in FIG. 6, the first end cap 60 and the second end cap 62 are releasably connected to the first wall end 46 and the second wall end 52 as earlier described. The upper cup bracket 126 includes a upper cup bracket bar 142 having upper cup bracket bar apertures 146 extending through opposite ends 150 of the upper cup bracket bar 142 similar to the longitudinal collar bar 110. Each of the upper cup bracket bar apertures 146 are aligned with a respective body positioning channel 88 and second side surface aperture 90 of one of the first end cap 60 and second end cap 62.

In this alternative embodiment, the upper cup bracket bar 142 is integrally formed with a upper pole receiver 134 as a single unit component. The upper pole receiver 134 is preferably sized to receive the diameter of the upper portion of the support pole 128. In an operative position, the upper pole receiver 134 is disposed in a downward direction towards a dock surface 192. Following the insertion of the support pole 128 into the upper pole receiver 134, a plurality of setscrews may be inserted within upper pole receiver apertures 136, which are located on the surface of the upper pole receiver 134 opposite to the upper cup bracket bar 142. Tightening of the setscrews establishes contact with the exterior surface of the upper portion of the support pole 128. The tightening of the setscrews establish a pressure fit or pressure contact to prevent inadvertent separation or repositioning of the upper cup bracket 126 as attached to the light assembly frame 38 and holding the light assembly 26 from the upper portion of the support pole 128. The light assembly 26 is thereby disposed above a dock or walkway for provision of illumination from the light elements 34.

It should be noted that the engagement between the lower beam aperture's 94 and the insert aperture's 74 will be on the bottom surface of the light assembly frame 38 when the upper cup bracket 126 receives the top of the support pole 128. In the operative position, the lower beam aperture's 94 and the insert aperture's 74 will be positioned downwardly, and the open top 56 will be directed upwardly relative to the support pole 128. The light assembly 26 may then be placed within the open top 56 for removable engagement to the light assembly frame 38 as previously described.

In this alternative embodiment, opposite to the upper cup bracket 126 on the support pole 128 is located the lower cup bracket 130. The lower cup bracket 130 preferably includes a lower cup bracket bar 144 as integral to a lower pole receiver 138. The lower cup bracket bar 144 includes lower cup bracket bar apertures 148 disposed through opposite ends 152 of the lower cup bracket bar 144 similar to the longitudinal collar bar 110. Each of the lower cup bracket bar apertures 148 may be used to receive mechanical fasteners, one example of which being bolts and nuts, to releasably connect the lower cup bracket bar 144 to the support structure or frame of a dock below a walking surface. In this embodiment, the support structure or frame of the dock below the walking surface may have openings or slots to receive the bolts and nuts to secure the reconfigurable waterfront lighting device 10 including the upper cup bracket 126, support pole 128, lower cup bracket 130, light assembly frame 38 and light assembly 26 at a desired location above the dock walking surface.

Alternatively as depicted in FIG. 6, a lower press plate 132 may be provided having lower press plate opposite ends 154, which in turn include lower press plate apertures 156. In this embodiment, the lower cup bracket bar 144 may be disposed to the exterior of a support structure or frame of a dock, and the lower press plate 132 may be positioned to the interior of a support structure or frame of a dock, proximate to the lower cup bracket bar 144. Bolts and nuts may pass through the lower cup bracket bar apertures 148 and the lower press plate apertures 156 located on opposite sides of the support structure or frame of the dock. Tightening of the bolts and nuts will move the lower cup bracket bar 144 and lower press plate 132 towards each other squeezing the support structure or frame of the dock therebetween.

It should be noted that any suitable mechanical fasteners may be substituted for the bolts and nuts identified herein that the preference of an individual to conform to the particular support structures or frame of a dock.

Any desired number of reconfigurable waterfront lighting device's 10 having an upper cup bracket 126, support pole 128, lower cup bracket 130, light assembly frame's 38 and light assemblies 26 may be used along a dock surface 192 for the provision of illumination as required for a particular application or dock configuration. It should also be noted that the mechanical fasteners utilized to secure the lower cup bracket bar 144 and lower press plate 132 to the support structure or frame of the dock may be releasable, and may be resistant to rust and/or failure when exposed to moisture.

The materials selected for the upper cup bracket 126, support pole 128, lower cup bracket 130, light assembly frame 38 and light assembly 26 may be identical to, or different as compared to the materials identified above. Combinations of moisture resistant, corrosion resistant, and rust resistant materials are contemplated, as well as combinations of materials which are sturdy and do not fail when used for the purposes identified herein.

In the embodiment as depicted in FIG. 6, in the operative position, the upper pole receiver 134 receives the support pole 128 at the top of the support pole 128. The lower beam aperture's 94 and the insert aperture's 74 are positioned downwardly and the open top 56 is positioned upwardly relative to the support pole 128. The light assembly 26 may then be placed within the open top 56 and the light assembly frame 38 as previously described with the light element's 34 are directed downwardly to provide illumination to a dock surface 192.

In at least one alternative embodiment, a supplemental component identified as a pole clamp assembly is identified by reference numeral 158 as shown in FIG. 8.

In the pole clamp assembly 158 embodiment as depicted in FIG. 8, the first end cap 60 and the second end cap 62 are releasably connected to the first wall end 46 and second wall end 52 as earlier described. The pole clamp assembly 158 includes a lower pole clamp bracket 160 having a lower pole clamp receiver 162. In addition, the pole clamp assembly 158 includes a lower pole clamp bar 164 integral to the lower pole clamp receiver 162 where the lower pole clamp receiver 162 is disposed in an upward direction away from a dock surface 192.

The lower pole clamp bar 164 includes lower pole clamp bar aperture's 168 extending through opposite ends 166 similar to the longitudinal collar bar 110. Each of the lower pole clamp bar aperture's 168 are aligned with a respective body positioning channel 88 and second side surface aperture 90 of one of the first end cap 60 and second end cap 62.

In this alternative embodiment, the lower pole clamp bracket 160, lower pole clamp receiver 162 and lower pole clamp bar 164 are integral to each other and are formed as a single unit component. The lower pole clamp receiver 162 is preferably sized to receive a matching diameter sized support pole 128. In an operative position, the lower pole clamp receiver 162 is disposed in an upward direction which is away from a dock surface 192. In this embodiment, the light assembly frame 38 is releasably attached to the lower pole clamp bar 164 where the lower beam aperture's 94 and the insert aperture's 74 are positioned downwardly towards a dock surface 192. In this embodiment, the open top 56 is positioned upwardly and the open bottom 58 is positioned downwardly.

In at least one alternative embodiment, following the positioning of the support pole 128 within the lower pole clamp receiver 162, a plurality of mechanical fasteners such as setscrews may be inserted within lower pole clamp receiver apertures 170 which are located on the opposite surface of the lower pole clamp receiver 162 relative to the lower pole clamp bar 164. The mechanical fasteners or setscrews may be tightened to contact the exterior surface of the lower portion of the support pole 128. Tightening of the setscrews establish a pressure fit or pressure contact to prevent inadvertent separation of the lower pole clamp bracket 160 as attached to the light assembly frame 38 from the support pole 128. In this embodiment, the light assembly frame 38 engages the light assembly 26 on the lower portion of the support pole 128, with the light element's 34 generally providing illumination downwardly towards a dock surface 192.

It should be noted that the engagement between the lower beam aperture's 94 and the insert aperture's 74 will occur on the bottom surface of the light assembly frame 38 when the lower pole clamp receiver 162 is engaged to the bottom of the support pole 128. The light assembly 26 may then be placed within the open top 56 of the light assembly frame 38 as previously described, with the light element's 34 directed downwardly towards a dock surface 192.

In this alternative embodiment as depicted in FIG. 8, opposite to the pole clamp assembly 158 on the support pole 128 is located a pole grasping assembly 172. The pole grasping assembly 172 preferably includes a pole grasping collar 174 as integral to a pole grasping bracket 176. In an operational position, the pole grasping collar 174 is disposed in surrounding engagement relative to a support pole 128.

In some embodiments, the pole grasping collar 174 and pole grasping bracket 176 are integral to each other and are a unitary component. In other embodiments, the pole grasping collar 174 may be releasably engaged to the pole grasping bracket 176 through the use of a releasable mechanical fastener such as a threaded screw or bolt.

The pole grasping collar 174 may have any height dimension as required for a particular application and any diameter dimension as required to surround the diameter provided for the support pole 128.

In at least one embodiment, the pole grasping bracket 176 is substantially U-shaped, having a vertical orientated clamp plate 178. The clamp plate 178 preferably includes flange walls 180 extending outwardly from the clamp plate 178 in a direction away from the pole grasping collar 174.

In at least one embodiment a mechanical fastener as earlier described may be inserted into a clamp plate aperture 196 which is centrally positioned relative to the interior of the clamp plate 178. The clamp plate aperture 196 may be aligned with one of the pole grasping collar apertures 186 whereupon the mechanical fastener may be used to releasably attach the clamp plate 178 to the pole grasping collar 174.

In some embodiments, each of the flange walls 180 include a flange wall slot 182 which are aligned relative to each other. In a preferred embodiment, the flange walls 180 are constructed and arranged for positioning on opposite sides of the support pole 128, where the interior of the clamp plate 178 is in contact with the exterior surface of the support pole 128.

In at least one alternative embodiment, the flange wall slot's 182 are vertically centered relative to the pole grasping collar 174. An adjustable band clamp 184 may be disposed within or connected to each of the flange wall slot's 182. The adjustable band clamp 184 may surround and be tightened relative to a waterfront structure such as a dock lift or pillar. The adjustable band clamp 184 as disposed around the exterior surface of a waterfront structure when tightened may position the reconfigurable waterfront lighting device 10, including the pole clamp assembly 158, at a desired vertical height relative to a dock surface 192. In this regard the support pole 128 extending vertically between the lower pole clamp receiver 162 and the pole grasping collar 174 may have any length dimension as desired to positioned the light assembly frame 38 above a dock surface 192.

In at least one embodiment, pole grasping collar apertures 186 are preferably centrally disposed relative to the height dimension for the pole grasping collar 174. A mechanical fastener such as a set screw, screw, nut, bolt, or rod may be rotatably disposed within pole grasping collar aperture's 186 and rotated to create a pressure contact or fit relative to the exterior surface of the support pole 128 to secure the pole clamp assembly 158 in a desired vertical position relative to a dock surface 192. In addition, the pole grasping collar 174 may be rotated relative to the support pole 128 to place the light assembly frame 38 at a desired angle relative to a dock surface 192. Further, the pole grasping bracket 176 may be rotated relative to the vertical waterfront structure to dispose the light assembly frame 38 at any desired angle relative to a dock surface 192.

The pole clamp assembly 158 may be formed of the same or other material as previously identified for the upper cup bracket 126, support pole 128, lower cup bracket 130, upper pole receiver 134, and lower pole receiver 138 as well as the other alternative embodiments identified herein for the supplemental components. Alternatively the elements of the supplemental components may be formed of the same or other combinations of materials as required for a particular application or environment.

In an alternative embodiment, the adjustable band clamp 184 may be omitted from the pole clamp assembly 158 and clamp plate 178 may include a plurality of plate clamp apertures 188 which may receive a mechanical fastener such as a screw or bolt to attach the pole clamp assembly 158 and clamp plate 178 directly to a waterfront structure such as a beam or upright.

It should be noted that any suitable mechanical fastener may be substituted for the bolts and/or screws as identified herein at the preference of an individual to conform to the particular support structure or frame of a waterfront structure or dock.

Figure 10:
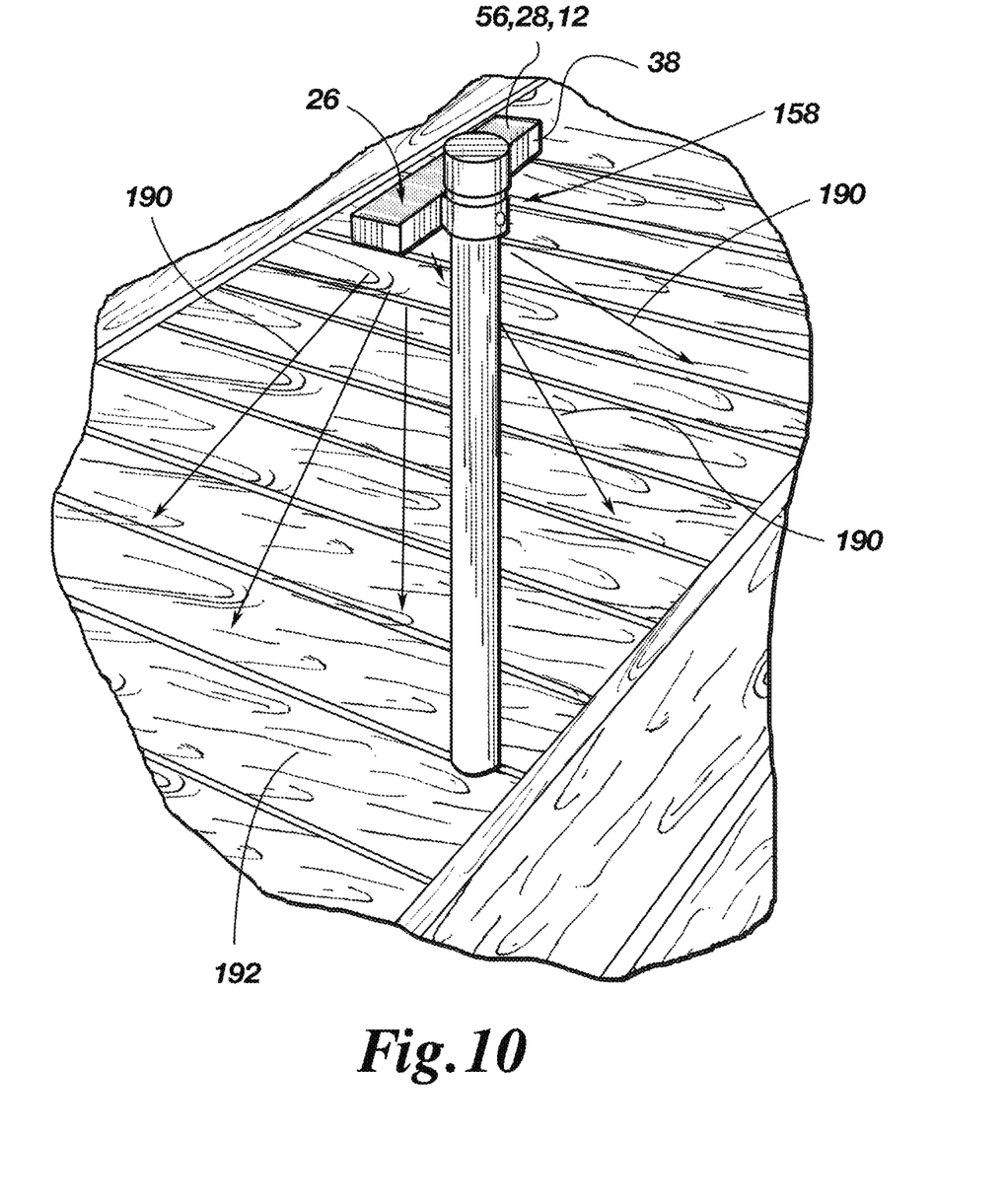
FIG. 10 is an environmental view of one alternative embodiment of the Waterfront Lighting Device engaged a waterfront structure above a dock.

In one alternative embodiment as shown in FIG. 10, the light assembly 26 and the light assembly frame 38 are shown engaged to a supplemental component such as a dock support pole 128. In this embodiment the lower beam aperture's 94 and the insert aperture's 74 are positioned downwardly and the open top 56 is positioned upwardly on the light assembly frame 38. The light assembly 26 may then be placed within the open top 56 of the light assembly frame 38 as previously described. The light elements 34 are directed downwardly to provide illumination as depicted by arrows 190 onto a dock surface 192.

It should be noted that the materials used to form the light assembly frame 38 and the supplemental components, including but not limited to the L-shaped bracket 98, lateral collar 108, longitudinal collar bar 110, end collar 122, lower cup bracket 130, lower press plate 132, upper pole receiver 134, upper cup bracket bar 142, lower cup bracket bar 144, pole clamp assembly 158, pole grasping assembly 172, as well as the other alternative components identified and described herein will not rust or degrade when exposed to water or moisture over extended periods of time. The particular materials identified or selected for the reconfigurable waterfront lighting device 10, light assembly frame 38 and supplemental components, may be used in any combination or alternative combinations, as required by a particular application. In addition, the individual elements identified for the supplemental components may be interchanged and substituted with any other of the elements of another supplemental component as required by a particular application.

In a first alternative embodiment the illumination device includes a light assembly frame having a first longitudinal extending wall, a second longitudinal extending wall, a first upper beam extending between the first longitudinal extending wall and the second longitudinal extending wall at a first wall end, a first lower beam extending between the first longitudinal extending wall and the second longitudinal extending wall at the first wall end, a second upper beam extending between the first longitudinal extending wall and the second longitudinal extending wall at a second wall end, a second lower beam extending between the first longitudinal extending wall and the second longitudinal extending wall at the second wall end, the light assembly frame having a open top and a open bottom; a first end cap having a first rectangular shaped insert, a first insert top surface, a first insert bottom surface, at least two first insert side surfaces, each of the at least two first insert side surfaces extending between the first insert top surface and the first insert bottom surface on opposite sides of the first rectangular shaped insert, a first insert face engaged to the first insert top surface, the first insert bottom surface, and the at least two first insert side surfaces, the first insert face being constructed and arranged for positioning within an interior of the light assembly frame in the first wall end, a first insert aperture through the first insert bottom surface and the first lower beam, a first top body surface proximate and exterior of the first insert top surface, a first bottom body surface proximate and exterior of the first insert bottom surface, a first body side surface proximate and exterior of the first top body surface and the first bottom body surface, a first body second side surface proximate and exterior of the first top body surface and the first bottom body surface opposite to the first body side surface, a first exterior body face proximate and exterior to the first top body surface, the first bottom body surface, the first body side surface and the first body second side surface, the first exterior body face being opposite to the first insert face, and a first body second side surface aperture traversing the first body second side surface; a second end cap having a second rectangular shaped insert, a second insert top surface, a second insert bottom surface, and at least two second insert side surfaces, each of the two second insert side surfaces extending between the second insert top surface and the second insert bottom surface on opposite sides of the second rectangular shaped insert, a second insert face engaged to the second insert top surface, the second insert bottom surface, and the at least two second insert side surfaces, the second insert face being constructed and arranged for positioning within an anterior of the light assembly frame in the second wall end and a second insert aperture through the second lower beam and the second insert bottom surface, a second top body surface proximate and exterior of the second insert top surface, a second bottom body surface proximate and exterior of the second insert bottom surface, a second body first side surface proximate and exterior of the second top body surface and the second bottom body surface, a second body second side surface proximate and exterior of the second top body surface and the second bottom body surface opposite to the second body first side surface, a second exterior body face proximate and exterior to the second top body surface, the second bottom body surface, the second body first side surface, and the second body second side surface, the second exterior body face being opposite to the second insert face, and a second body second side surface aperture traversing the second body second side surface; and a light assembly removably disposed in the open top, the light assembly having a top having a ledge and a solar cell charger, a bottom, a first end, a second end, a first side and a second side, the bottom having at least one selection switch, a on/off switch, a controller in electrical communication with the at least one selection switch and a plurality of light elements, the controller regulating illumination generated from the light elements through the open bottom wherein the light assembly frame is constructed and arranged for engagement to a structural component, the structural component being constructed and arranged for engagement to a waterfront structure.

In a second alternative embodiment according to the first alternative embodiment, the structural component having a L-shaped bracket, the L-shaped bracket being releasably engaged to the first end cap and the second end cap.

In a third alternative embodiment according to the second alternative embodiment, the L-shaped bracket having a L-shaped bracket vertical wall disposed adjacent to one of the first longitudinal extending wall and the second longitudinal extending wall.

In a fourth alternative embodiment according to the first alternative embodiment, the structural component has a lateral collar engaged to one of the first longitudinal extending wall and the second longitudinal extending wall 42 approximately equal distances between the first end cap and the second end cap.

In a fifth alternative embodiment according to the fourth alternative embodiment, the lateral collar has a longitudinal collar bar, the longitudinal collar bar being releasably engaged to the first end cap and the second end cap.

In a sixth alternative embodiment according to the fifth alternative embodiment, the lateral collar has a first diameter dimension, the lateral collar being constructed and arranged for positioning over a support pole, the support pole having a second diameter dimension being smaller than the first diameter dimension.

In a seventh alternative embodiment according to the first alternative embodiment, the structural component has an end collar engaged to one of the first end cap and the second end cap.

In an eighth alternative embodiment according to the seventh alternative embodiment, each of the first end cap and the second end cap have an insert face aperture, the end collar further having an end collar attachment hole, and an end collar fastener releasably engaged to the end collar attachment hole and the insert face aperture.

In a ninth alternative embodiment according to the first alternative embodiment, the structural component has an upper cup bracket, a support pole, and a lower cup bracket, the upper cup bracket being releasably engaged to the first end cap and the second end cap, the support pole being releasably engaged to and descending from the upper cup bracket at a support pole upper end, the support pole being releasably engaged to and ascending from the lower cup bracket at a support pole lower end, and the lower cup bracket being releasably engaged to the support pole proximate to the support pole lower end.

In a tenth alternative embodiment according to the ninth alternative embodiment, the upper cup bracket has an upper pole receiver and an upper cup bracket bar, the upper cup bracket bar being releasably engaged to the first end cap and the second end cap.

In a eleventh alternative embodiment according to the tenth alternative embodiment, the lower cup bracket has a lower cup bracket bar and a lower press plate being engaged to the lower cup bracket bar.

In a twelfth alternative embodiment according to the eleventh alternative embodiment, the lower cup bracket bar has lower cup bracket bar opposite ends, each of the lower cup bracket bar opposite ends having a lower cup bracket bar aperture, the lower press plate having lower press plate opposite ends, each of the lower press plate opposite ends having a lower press plate aperture, and an adjustable fastener engaged to each of the lower cup bracket bar apertures and the lower press plate apertures.

In a thirteenth alternative embodiment according to the first alternative embodiment, the structural component has a pole clamp assembly, the pole clamp assembly having a lower pole clamp bracket having a lower pole clamp receiver, a lower pole clamp bar engaged the lower pole clamp receiver, a support pole, and a pole grasping assembly, the pole grasping assembly having a pole grasping collar having a pole grasping bracket.

In a fourteenth alternative embodiment according to the thirteenth alternative embodiment, the lower pole clamp receiver engages the support pole at a support pole lower end, the lower pole clamp bar being engaged to the first end cap and the second end cap, the lower pole clamp receiver having at least one lower pole clamp receiver aperture.

In a fifteenth alternative embodiment according to the fourteenth alternative embodiment, the pole grasping collar has at least one pole grasping collar aperture and a pole grasping bracket, the pole grasping bracket having an adjustable band clamp, the adjustable band clamp being constructed and arranged for releasable engagement to the waterfront structure.

In a sixteenth alternative embodiment according to the fifteenth alternative embodiment, the pole grasping bracket has a clamp plate and two flange walls, each of the flange walls having an aligned flange wall slot, the flange wall slots being constructed and arranged for engagement to the adjustable band clamp.

This completes the description of the preferred and alternate embodiments of the invention. Those skilled in the art may recognize other equivalents to the specific embodiment described herein which equivalents are intended to be encompassed by the claims attached hereto.

The above disclosure is intended to be illustrative and not exhaustive. This description will suggest many variations and alternatives to one of ordinary skill in this art. The various elements shown in the individual figures and described above may be combined or modified for combination as desired. All these alternatives and variations are intended to be included within the scope of the claims where the term "comprising" means "including, but not limited to".

These and other embodiments which characterize the invention are pointed out with particularity in the claims annexed hereto and forming a part hereof. However, for further understanding of the invention, its advantages and objectives obtained by its use, reference should be made to the drawings which form a further part hereof and the accompanying descriptive matter, in which there is illustrated and described embodiments of the invention.

With respect to the above description, it is to be realized that the optimum dimensional relationships for the parts of the invention, to include variations in size, materials, shape, form, function and manner of operation, assembly and use, are deemed to be within the expertise of those skilled in the art, and all equivalent structural variations and therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:

1. An illumination device comprising:
a light assembly frame having a first longitudinal extending wall, a second longitudinal extending wall, a first upper beam extending between said first longitudinal extending wall and said second longitudinal extending wall at a first wall end, a first lower beam extending between said first longitudinal extending wall and said second longitudinal extending wall at said first wall end, a second upper beam extending between said first longitudinal extending wall and said second longitudinal extending wall at a second wall end, a second lower beam extending between said first longitudinal extending wall and said second longitudinal extending wall at said second wall end, said light assembly frame having an open top and an open bottom;
a first end cap having a first rectangular shaped insert, said first rectangular shaped insert being constructed and arranged for positioning within an interior of said light assembly frame in said first wall end;
a second end cap having a second rectangular shaped insert, said second rectangular shaped insert being constructed and arranged for positioning within said interior in said second wall end; and
a light assembly removably disposed in said open top, the light assembly having a top having a ledge and a solar cell charger, a bottom, said bottom having at least one selection switch and an on/off switch, said light assembly having a light assembly interior and a controller in said light assembly interior, said controller being in electrical communication with said at least one selection switch and a plurality of light elements, said controller regulating illumination generated from the light elements through said open bottom, wherein said light assembly frame is constructed and arranged for engagement to a structural component.

2. The illumination device according to claim 1, said structural component having a L-shaped bracket, said L-shaped bracket being releasably engaged to said first end cap and said second end cap.

3. The illumination device according to claim 2, wherein said L-shaped bracket has a L-shaped bracket vertical wall disposed adjacent to one of said first longitudinal extending wall and said second longitudinal extending wall.

4. The illumination device according to claim 1, said structural component having a lateral collar engaged to one of said first longitudinal extending wall and said second longitudinal extending wall approximately equal distances between said first end cap and said second end cap.

5. The illumination device according to claim 4, wherein said lateral collar has a longitudinal collar bar, said longitudinal collar bar being releasably engaged to said first end cap and said second end cap.

6. The illumination device according to claim 5, wherein said lateral collar has a first diameter dimension, said lateral collar being constructed and arranged for positioning over a support pole, said support pole having a second diameter dimension, said second diameter dimension being smaller than said first diameter dimension.

7. The illumination device according to claim 1, said structural component having an end collar engaged to one of said first end cap and said second end cap.

8. The illumination device according to claim 7, each of said first end cap and said second end cap comprising an insert face aperture, said end collar further comprising an end collar attachment hole, and an end collar fastener releasably engaged to said end collar attachment hole and said insert face aperture.

9. The illumination device according to claim 1, said structural component having an upper cup bracket, a support pole, and a lower cup bracket, said upper cup bracket being releasably engaged to said first end cap and said second end cap, said support pole being releasably engaged to and descending from said upper cup bracket at a support pole upper end, said support pole being releasably engaged to and ascending from said lower cup bracket at a support pole lower end, and said lower cup bracket being releasably engaged to said support pole proximate to said support pole lower end.

10. The illumination device according to claim 9, wherein said upper cup bracket has an upper pole receiver and an upper cup bracket bar, said upper cup bracket bar being releasably engaged to said first end cap and said second end cap.

11. The illumination device according to claim 10, wherein said lower cup bracket has a lower cup bracket bar and a lower press plate being adjustably engaged to said lower cup bracket bar.

12. The illumination device according to claim 11, wherein said lower cup bracket bar has lower cup bracket bar opposite ends, each of said lower cup bracket bar opposite ends having a lower cup bracket bar aperture, said lower press plate having lower press plate opposite ends, each of said lower press plate opposite ends having a lower press plate aperture, and an adjustable fastener engaged to each of said lower cup bracket bar apertures and said lower press plate apertures.

13. The illumination device according to claim 1, said structural component having a pole clamp assembly, said pole clamp assembly having a lower pole clamp bracket having a lower pole clamp receiver, a lower pole clamp bar engaged said lower pole clamp receiver, a support pole, and a pole grasping assembly, said pole grasping assembly having a pole grasping collar having a pole grasping bracket.

14. The illumination device according to claim 13, wherein said lower pole clamp receiver engages said support pole at a support pole lower end, said lower pole clamp bar being engaged to said first end cap and said second end cap, said lower pole clamp receiver having at least one lower pole clamp receiver aperture.

15. The illumination device according to claim 14, wherein said pole grasping collar has at least one pole grasping collar aperture and pole grasping bracket, said pole grasping bracket having an adjustable band clamp, said adjustable band clamp being constructed and arranged for releasable engagement to a waterfront structure.

16. The illumination device according to claim 15, said pole grasping bracket having a clamp plate and two flange walls, each of said flange walls having an aligned flange wall slot, said flange wall slots being constructed and arranged for engagement to said adjustable band clamp.

* * * * *